US008018901B2

United States Patent
Shimobayashi

(10) Patent No.: US 8,018,901 B2
(45) Date of Patent: Sep. 13, 2011

(54) MOBILE COMMUNICATION SYSTEM USING MOBILE TERMINAL AND HANDOVER CONTROL METHOD

(75) Inventor: Shinya Shimobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 921 days.

(21) Appl. No.: 11/993,174

(22) PCT Filed: Jul. 4, 2006

(86) PCT No.: PCT/JP2006/313265
§ 371 (c)(1),
(2), (4) Date: Dec. 19, 2007

(87) PCT Pub. No.: WO2007/004628
PCT Pub. Date: Jan. 11, 2007

(65) Prior Publication Data
US 2009/0034473 A1    Feb. 5, 2009

(30) Foreign Application Priority Data

Jul. 6, 2005    (JP) .................... 2005-196941

(51) Int. Cl.
*H04W 4/00*    (2009.01)
(52) U.S. Cl. ........................................ 370/331
(58) Field of Classification Search .............. 370/331, 370/334, 329, 332, 333, 345, 350, 342, 320, 370/335, 341, 330, 441, 328; 455/442, 434
See application file for complete search history.

(56) References Cited

U.S. PATENT DOCUMENTS 7,356,022 B2 *   4/2008   Takano et al. ............. 370/350
7,653,026 B2 *   1/2010   Obuchi et al. ............. 370/331

FOREIGN PATENT DOCUMENTS

| JP | 01190137 A | 7/1989 |
| JP | 2001238239 A | 8/2001 |
| JP | 2005229628 A | 8/2005 |
| JP | 2006025438 A | 1/2006 |

OTHER PUBLICATIONS

PCT/JP2006/313265 International Search Report, mailed Oct. 16, 2006.

* cited by examiner

*Primary Examiner* — Chi Pham
*Assistant Examiner* — Alexander Boakye

(57) ABSTRACT

A mobile communication system includes a plurality of base station apparatuses; and a mobile terminal configured to perform HSDPA (High Speed Downlink Packet Access) communication between the mobile terminal and the plurality of base station apparatuses. The mobile terminal has a receiving section configured to receive HS-SCCH (High Speed Shared Control Channel) signals from the base station apparatus as a source of handover and the base station apparatus as a destination of the handover at a same time.

6 Claims, 5 Drawing Sheets

MOBILE COMMUNICATION SYSTEM USING MOBILE TERMINAL AND HANDOVER CONTROL METHOD

TECHNICAL FIELD

The present invention relates to a mobile communication system using a mobile terminal and a handover control method, and especially relates to a handover control method in HSDPA (High Speed Downlink Packet Access) communication.

BACKGROUND ART

In HSDPA communication, the communication is performed by using HS-PDSCH (High Speed Physical Shared Downlink Channel), as a common channel in which mobile terminals share a code, and timing when a signal is transmitted from a base station by using the HS-PDSCH is peculiar to the base station. For this reason, in the HSDPA communication, it is impossible to transmit same data from a plurality of base stations in synchronization with a timing and perform soft handover in which the data are combined on the side of the mobile terminal. As a result, when it is required to perform the handover because of moving of the mobile terminal during the HSDPA communication, hard handover is performed in which the HSDPA communication with a currently connected base station is disconnected once and then the communication with a next base station is started. Thus, a time period during which the communication is interrupted is generated in the handover. The same process as described above is performed even if the timing of the HSDPA channel is synchronized with each other among base stations so that it is unnecessary that the communication is stopped. Thus, in case that the transmission timing is synchronized with each other among base stations, as in case that a handover is performed between sectors, the same process as described above is performed so that a useless stopping time of the communication is generated, regardless of that it is not necessarily required to stop the communication once.

Here, in a mobile communication system, a method of using reception quality in a mobile terminal as a criterion in selecting a next base station is proposed in Japanese Laid Open Patent Applications (JP-A-Heisei 1-190137 and JP-P2001-238239A). As described above, even in the method of using the reception quality in the mobile terminal as the criterion in selecting the next base station, this useless interruption time is generated.

DISCLOSURE OF INVENTION

An object of the present invention is to provide a mobile communication system, a mobile terminal, and a handover control method used for them, in which handover can be performed without stopping an HSDPA communication once, when transmission timings of the HSDPA channel signals with base stations are aligned, as in handover between sectors.

A mobile communication system according to the present invention performs HSDPA (High Speed Downlink Packet Access) communication between a mobile terminal apparatus and base station apparatuses. The mobile terminal includes a receiving section for receiving HS-SCCH (High Speed Shared Control Channel) signals from the base station device as a source of handover and the base station device as a destination of the handover at a same time.

A mobile terminal apparatus according to the present invention performs an HSDPA (High Speed Downlink Packet Access) communication with base station apparatuses. The mobile terminal includes a receiving section for receiving HS-SCCH (High Speed Shared Control Channel) signals from the base station apparatus as a source of handover and the base station apparatus as a destination of the handover at a same time.

In a handover control method according to the present invention, an HSDPA (High Speed Downlink Packet Access) communication is carried out between a mobile terminal and base station apparatuses. The mobile terminal receives HS-SCCH (High Speed Shared Control Channel) signals from the base station apparatus as a source of handover and the base station apparatus as a destination of the handover at a same time.

That is to say, the mobile communication system of the present invention can reduce a time during which the communication is stopped in the handover in the HSDPA (High Speed Downlink Packet Access) communication. More specifically, in the mobile communication system of the present invention, when the mobile terminal tries to perform the handover, the mobile terminal receives the HS-SCCH (High Speed Shared Control Channel) signals from two base stations at a same time for a certain period of the communication as the mobile terminal moves. In this case, the number of the HS-SCCH signals received from two base stations does not exceed four since the maximum number of the HS-SCCH signals receivable by the mobile terminal is predetermined as four.

According to this, in the mobile communication system of the present invention, the handover can be performed without stopping HSDPA communication once, when transmission timings of the HSDPA channel signals with the base stations are aligned, as in the handover between sectors, and the handover with no instantaneous stop can be realized.

BEST MODE FOR CARRYING OUT THE INVENTION

Hereinafter, a mobile communication system according to exemplary embodiments of the present invention will be described in detail with reference to the attached drawings.

Figure 1:
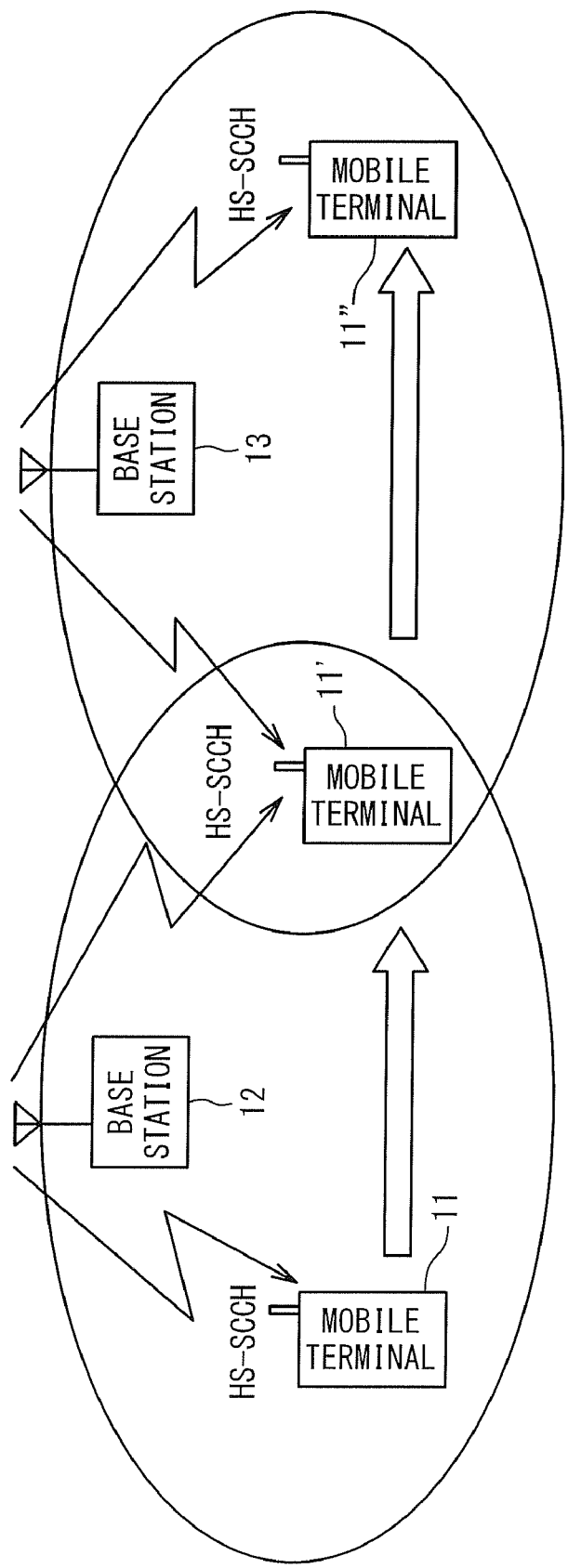
FIG. 1 is a block diagram showing a configuration of a mobile communication system according to an exemplary embodiment of the present invention.

FIG. 1 is a block diagram showing a configuration of a mobile communication system according to an exemplary embodiment of the present invention. In FIG. 1, a mobile terminal 11 such as a mobile phone moves in areas of base stations 12 and 13. In this case, the base stations 12 and 13 are base stations for HSDPA (High Speed Downlink Packet Access) communication. The mobile terminal is shown as mobile terminals 11' and 11", which receives HS-SCCH (High Speed Shared Control Channel) signals from the two base stations 12 and 13.

Figure 2:
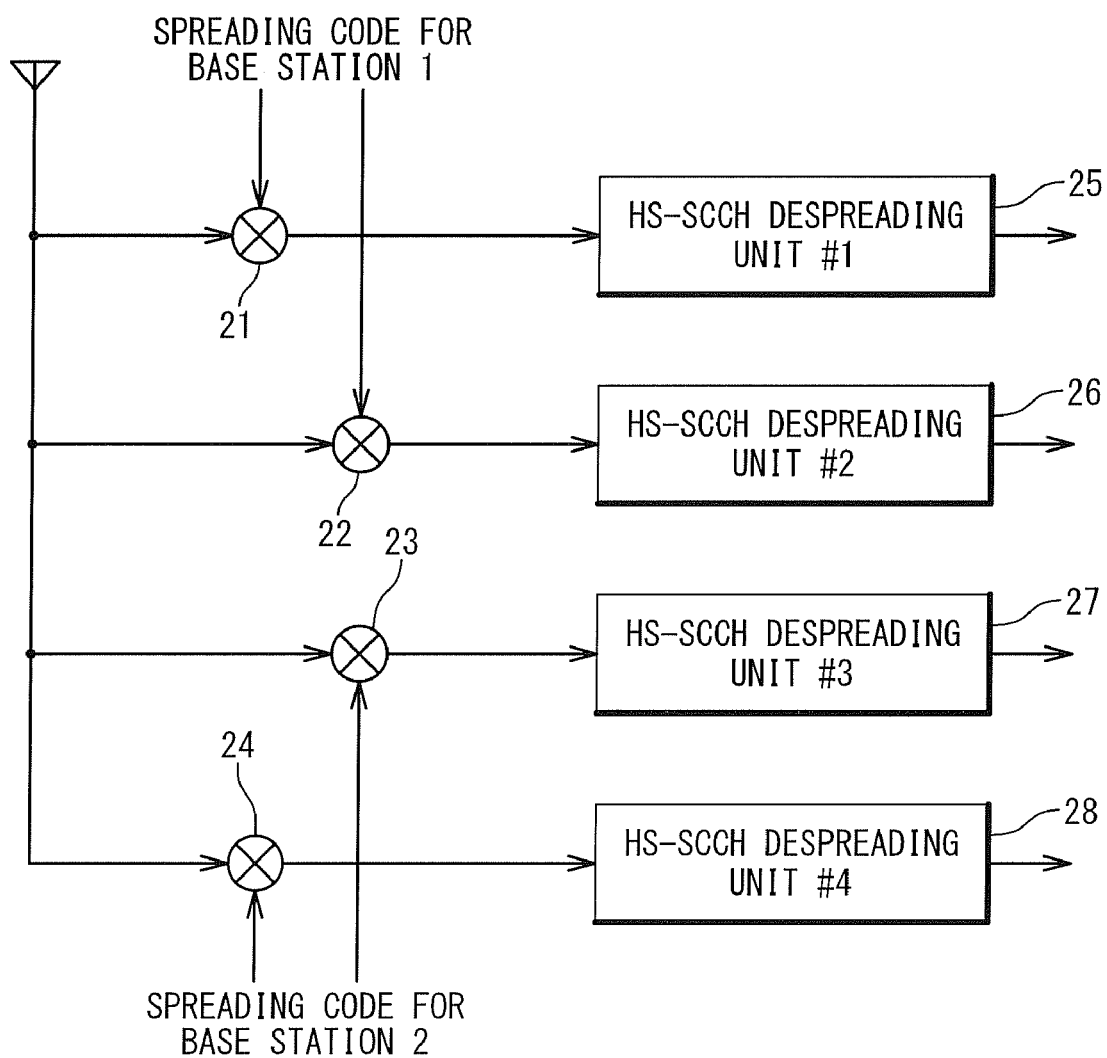
FIG. 2 is a block diagram showing a configuration of a receiving section of a mobile terminal 11 shown in FIG. 1.

FIG. 2 is a block diagram showing a configuration of a receiving section of the mobile terminal 11 shown in FIG. 1. In FIG. 2, the mobile terminal 11 includes multipliers 21 to 24, a HS-SCCH despreading section (#1) 25, a HS-SCCH despreading section (#2) 26, a HS-SCCH despreading section (#3) 27, and a HS-SCCH despreading section (#4) 28. The multipliers 21 to 24 multiply a received signal by Channelisation Codes, and the HS-SCCH despreading section (#1) 25, the HS-SCCH despreading section (#2) 26, the HS-SCCH despreading section (#3) 27, and the HS-SCCH despreading section (#4) 28 perform despreading processes on the multiplication results from the multipliers 21 to 24 to extract the HS-SCCH signals from the received signal.

Figure 5:
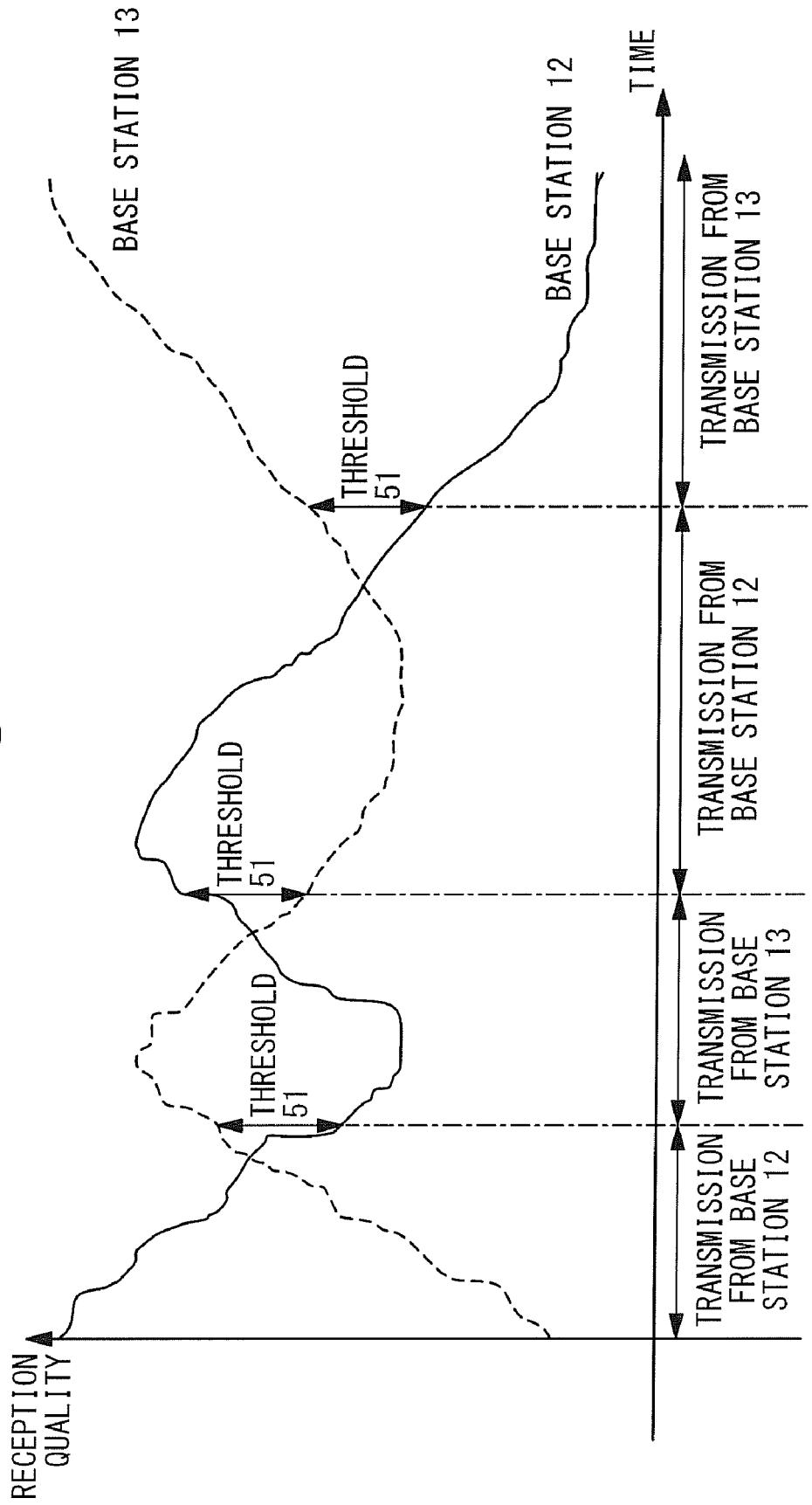
FIG. 5 is a diagram showing signal intensity in a base station shown in FIG. 1.

FIG. 5 is a diagram showing signal intensity in the base stations 12 and 13 shown in FIG. 1. In FIG. 5, a threshold value 51 is a predetermined value. When a difference of reception power from the base stations 12 and 13 in the mobile terminals 11, 11', and 11" exceeds the threshold value 51, the base station in SHO (Soft Handover) is switched to a base station from which the HS-SCCH signals is received.

Figure 3:
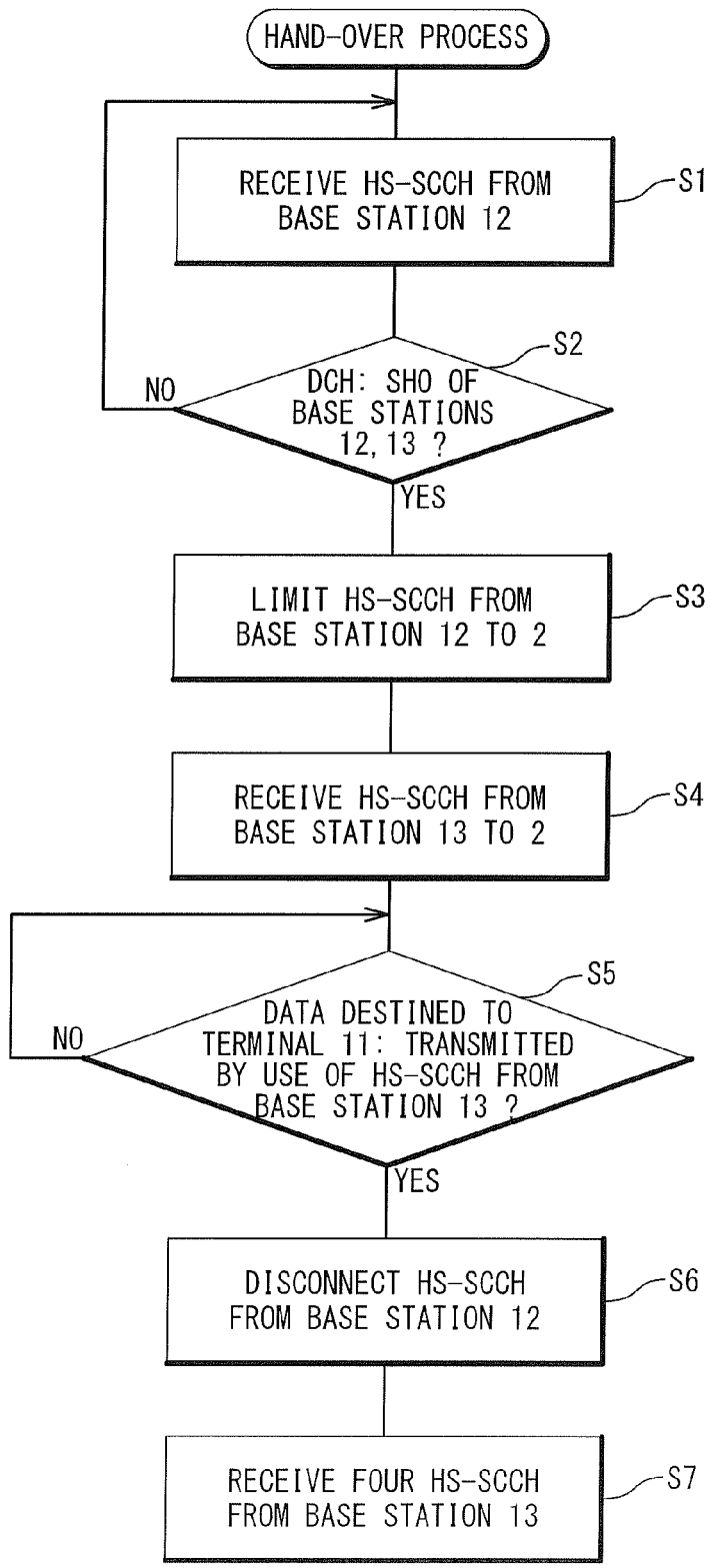
FIG. 3 is a flowchart showing an operation of the mobile terminal according to the exemplary embodiment of the present invention.
Figure 4:
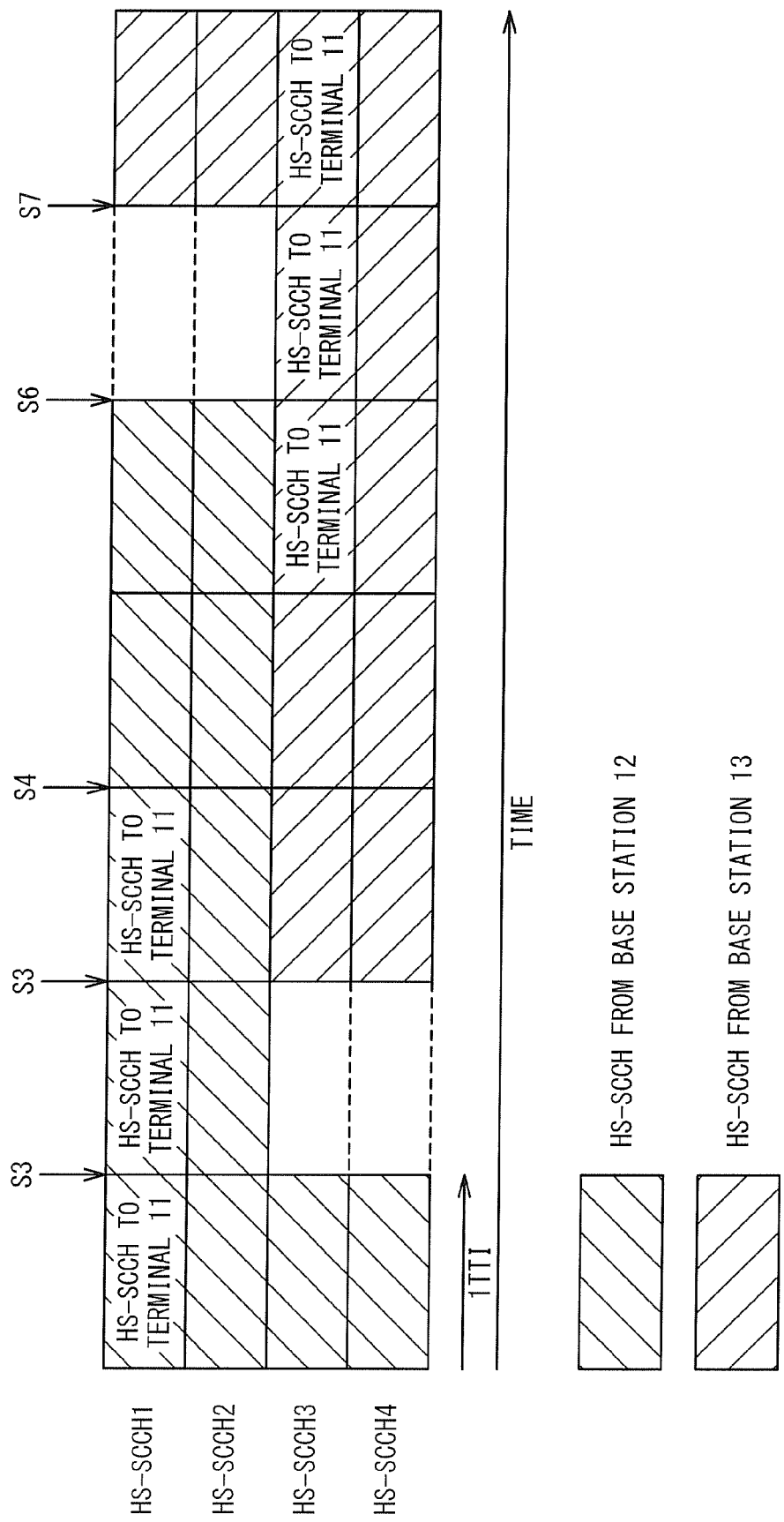
FIG. 4 is a diagram showing reception of HS-SCCH signals by the mobile terminal according to the exemplary embodiment of the present invention.

FIG. 3 is a flowchart showing an operation of the mobile terminal according to the exemplary embodiment of the present invention, and FIG. 4 is a diagram showing the reception of HS-SCCH signals in the mobile terminal according to the exemplary embodiment of the present invention. Referring to these drawings, an operation of the mobile communication system according to the exemplary embodiment of the present invention will be described.

The mobile terminal 11 moves as shown in FIG. 1, and it is supposed for the mobile terminal to move from a position of the mobile terminal 11, to a position of the mobile terminal 11', and to a position of the mobile terminal 11'. When being in the position 11, the mobile terminal 11 receives only the HS-SCCH signals from the base station 12. When the mobile terminal 11 moves to the position 11' so that a DCH (Dedicated Channel) of an individual channel is in the SHO state, the mobile terminal 11' limits the HS-SCCH signals from the base station 12 to two, and receives two HS-SCCH signals from the base station 13. Further, when the mobile terminal 11 moves to the position 11", the mobile terminal 11' stops reception of the HS-SCCH signals from the base station 12, and receives four HS-SCCH signals from the base station 13.

In the position of the mobile terminal 11', HS-SCCH signal detection is performed in a configuration shown in FIG. 2. The mobile terminal 11' must have an ability to receive up to four HS-SCCH signals at a same time. For this reason, the mobile terminal 11 has four despreading sections for the HS-SCCH signals [the HS-SCCH despreading section (#1) 25, the HS-SCCH despreading section (#2) 26, the HS-SCCH despreading section (#3) 27, and the HS-SCCH despreading section (#4) 28].

A HS-SCCH 1 signal and a HS-SCCH 2 signal received from the base station 12 are multiplied by Scrambling Code for the base station 12 in the multipliers 21 and 22, and the Channelisation Code of the HS-SCCH signal is multiplied and then the despreading process is performed. A HS-SCCH 3 signal and a HS-SCCH 4 signal received from the base station 13 are multiplied by Scrambling Code for the base station 13 in the multipliers 21 and 22, and the Channelisation Code of the HS-SCCH signal is multiplied and then the despreading process is performed.

When being in the position of the mobile terminal 11, the mobile terminal 11 receives four HS-SCCH signals from the base station 12 (Step S1 in FIG. 3). When the mobile terminal moves to the position of the mobile terminal 11', the mobile terminal is in the SHO state between the base station 12 and the base station 13 in this position 11' (Step S2 in FIG. 3). The number of the HS-SCCH signals received from the base station 12 is limited to two (Step S3 in FIG. 3). Further, reception of two HS-SCCH signals from the base station 13 starts (Step S4 in FIG. 3). Thus, the HS-SCCH signals are received from the base station 12 and the base station 13.

When data destined to the mobile terminal 11" itself is detected from the HS-SCCH signals received from the base station 13 once (Step S5 in FIG. 3), the mobile terminal 11" stops reception of the HS-SCCH signals from the base station 12 (Step S6 in FIG. 3). Also, the mobile terminal 11" increases the number of the HS-SCCH signals received from the base station 13 from two to four (Step S7 in FIG. 3).

In FIG. 4, the numbers shown by arrows correspond to respective steps in the flowchart shown in FIG. 3. The mobile terminal 11 receives four HS-SCCH signals from the base station 12 until a timing indicated by the arrow S3 (corresponding to the step S3). When the DCH becomes the SHO with the base station 13 by signaling from a network side in the arrow S3, the mobile terminal 11' sets the number of HS-SCCH signals received from the base station 12 as two, and starts to receive two HS-SCCH signals from the base station 13 in the arrow S4 (corresponding to step S4).

When the DCH transmission from the base station 12 is instructed by signaling from the network side in the arrow S5 (corresponding to step S5) and only the DCH reception from the base station 13 is performed, the mobile terminal 11" stops receiving the HS-SCCH signals from the base station 12 in the arrow S6 (corresponding to step S6) and the number of the HS-SCCH signals from the base station 13 is set as four in the arrow S7 (corresponding to step S7).

As mentioned above, in the present exemplary embodiment, it becomes possible to perform the handover without stopping the HSDPA communication in the handover between the base stations 12 and 13 whose timings of HSDPA channels is aligned, and a communication stop time can be reduced.

In the present exemplary embodiment, although the mobile terminal 11' receives two HS-SCCH signals from each of the base stations 12 and 13, an allocation method of the HS-SCCH signals may not be a way of two by two, as shown in the present exemplary embodiment, and is not restricted to this way, when the number of the HS-SCCH signals received by the mobile terminal 11' from the base stations 12 and 13 is four or less.

In addition, in the present exemplary embodiment, although the maximum number of the HS-SCCH signals received by the mobile terminals 11, 11', and 11" is supposed to be four, eight HS-SCCH signals from a source of the handover and a destination of the handover may be received by setting the number of the HS-SCCH signals receivable by the mobile terminals 11, 11', and 11" to eight.

Furthermore, in the present exemplary embodiment, a control is carried out in such a manner that the HS-SCCH signals destined to the mobile terminal 11' are transmitted in the SHO from only one of the base stations 12 and 13 selected based on a transmission signal intensity from the mobile terminal 11'. However, such a control may not be carried out, and the base stations 12 and 13 may transmit the signals independently. In this case, the mobile terminal 11 may select the base station used for the receiving the signals depending on a unique determination of the mobile terminal 11' such as reception quality.

On the other hand, the present exemplary embodiment, it is supposed that Channelisation Codes allocated to the HS- SCCH signals are same in the base station 12 as the source of the handover and in the base station 13 as the destination of the handover. However, it is possible to change the Channelisation Code to be decoded by the mobile terminal 11' in accordance with signaling of SHO start/end, and it is possible to allocate unique Codes to the base stations 12 and 13.

In addition, in the present exemplary embodiment, although the mobile terminal 11' receives two HS-SCCH signals from each of the base stations 12 and 13 for a certain period, the control may be carried out in such a manner that four HS-SCCH signals are received only from either one of the base stations in accordance with quality of reception signals from the base stations 12 and 13 by the mobile terminal 11'.

Furthermore, in such a case, a control may be carried out such that the HS-SCCH signals are transmitted only from a base station with better quality selected based on a reception quality report from the mobile terminal 11'. Also, a control may be carried out such that the mobile terminal 11' waits for the signals from the selected one of the base stations 12 and 13 which do not transmit useless HS-SCCH signals and HS-PDSCH signals. The number of HS-SCCH signals received from a plurality of the base stations by the mobile terminal is controlled not to exceed the number of receivable HS-SCCH signals.

Furthermore, in the present exemplary embodiment, a case that timings of the HS-SCCH signals between the base stations are aligned has been described. However, the alignment of the timings of the HS-SCCH signals between the base stations is not necessarily required.

The present invention can be applied to apparatuses corresponding to the above-described HSDPA communication such as a base station and a mobile terminal such as a mobile phone in the mobile communication system.

By employing a configuration and an operation mentioned below, the present invention can attain an effect that the handover can be performed without stopping the HSDPA communication once when the transmission timings of the HSDPA channels are aligned between the base stations, as in the handover between sectors.

What is claimed is:

1. A mobile communication system comprising:
    a plurality of base station apparatuses; and
    a mobile terminal configured to perform HSDPA (High Speed Downlink Packet Access) communication between said mobile terminal and said plurality of base station apparatuses;
    wherein said mobile terminal comprises a receiving section configured to receive HS-SCCH (High Speed Shared Control Channel) signals from said base station apparatus as a source of handover and said base station apparatus as a destination of the handover at a same time,
    wherein said receiving section stops the reception of the HS-SCCH signals from said base station apparatus as the source of the handover when a data destined to said mobile terminal is detected from the HS-SCCH signals from said base station apparatus as the destination of the handover,
    wherein said receiving section receives the HS-SCCH signals from said base station apparatus as the destination of the handover for a number of receivable HS-SCCH signals, after the reception of the HS-SCCH signals from said base station apparatus as the source of the handover is stopped, and
    wherein a number of the receivable HS-SCCH signals is more than a number of HS-SCCH signals received from said plurality of base station apparatuses by said mobile terminal.

2. The mobile communication system according to claim 1, wherein the HS-SCCH signals and the HS-PDSCH (High Speed Physical Shared Downlink Channel) signal are transmitted from said base station apparatus of the best reception quality based on a reception quality report from said mobile terminal on a soft handover.

3. A mobile terminal comprising:
    a receiving section configured to receive an HSDPA (High Speed Downlink Packet Access) communication with base station apparatuses and to receive HS-SCCH (High Speed Shared Control Channel) signals from said base station apparatus as a source of handover and said base station apparatus as a destination of the handover at a same time,
    wherein said receiving section stops the reception of the HS-SCCH signals from said base station apparatus as the source of the handover when a data destined to said mobile terminal is detected from the HS-SCCH signals from said base station apparatus as the destination of the handover,
    wherein said receiving section receives the HS-SCCH signals from said base station apparatus as the destination of the handover for a number of receivable HS-SCCH signals, after the reception of the HS-SCCH signals from said base station apparatus as the source of the handover is stopped, and
    wherein a number of receivable HS-SCCH signals received from said base station apparatus by said mobile terminal is more than a number of HS-SCCH signals from said base station apparatuses received by said mobile terminal.

4. A handover control method comprising:
    carrying out an HSDPA (High Speed Downlink Packet Access) communication between a mobile terminal and base station apparatuses; and
    receiving HS-SCCH (High Speed Shared Control Channel) signals from said base station apparatus as a source of handover and said base station apparatus as a destination of the handover by said mobile terminal at a same time,
    stopping the reception of the HS-SCCH signals from said base station apparatus as the source of the handover when a data destined to said mobile terminal is detected from the HS-SCCH signals from said base station apparatus as the destination of the handover, and
    receiving the HS-SCCH signals from said base station apparatus as the destination of the handover for a number of receivable HS-SCCH signals, after the reception of the HS-SCCH signals from said base station apparatus as the source of the handover is stopped,
    wherein a number of receivable HS-SCCH signals received from said base station apparatus by said mobile terminal is more than a number of HS-SCCH signals from said base station apparatuses received by said mobile terminal.

5. The handover control method according to claim 4, further comprising:
    transmitting the HS-SCCH signals and the HS-PDSCH (High Speed Physical Shared Downlink Channel) signal from said base station apparatus of the best reception quality based on a reception quality report from said mobile terminal on a soft handover.

6. The handover control method according to claim 4, further comprising:
   transmitting the HS-SCCH signals and the HS-PDSCH (High Speed Physical Shared Downlink Channel) signal from said base station apparatus of the best reception quality based on a reception quality report from said mobile terminal on a soft handover.

* * * * *